United States Patent
Holberg et al.

(10) Patent No.: US 8,893,546 B2
(45) Date of Patent: Nov. 25, 2014

(54) METHOD AND DEVICE FOR ADAPTING SIGNALS OF AN OXYGEN SENSOR IN THE AIR SUPPLY CHANNEL OF AN INTERNAL COMBUSTION ENGINE

(71) Applicants: Richard Holberg, Stuttgart (DE); Christian Reichert, Nuertingen (DE)

(72) Inventors: Richard Holberg, Stuttgart (DE); Christian Reichert, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 13/761,925

(22) Filed: Feb. 7, 2013

(65) Prior Publication Data

US 2013/0199177 A1    Aug. 8, 2013

(30) Foreign Application Priority Data

Feb. 8, 2012 (DE) .................... 10 2012 201 830

(51) Int. Cl.

| | | |
|---|---|---|
| *G01M 15/10* | (2006.01) | |
| *F02D 41/24* | (2006.01) | |
| *F02M 25/07* | (2006.01) | |
| *F01N 11/00* | (2006.01) | |
| *F02D 41/14* | (2006.01) | |
| *F02D 21/08* | (2006.01) | |
| *F02D 41/00* | (2006.01) | |

(52) U.S. Cl.
CPC ........ *F01N 11/00* (2013.01); *F02D 2041/1432* (2013.01); *F02D 2021/083* (2013.01); *F02D 41/2474* (2013.01); *F02D 41/0007* (2013.01); *F02D 2200/0406* (2013.01); *F02D 41/1456* (2013.01); *F02D 41/0052* (2013.01); *F02M 25/0754* (2013.01); *F02D 41/0055* (2013.01); *F02D 41/144* (2013.01); *Y02T 10/47* (2013.01); *F02D 2200/0414* (2013.01)
USPC ...................................... 73/114.73; 73/114.31

(58) Field of Classification Search
USPC ............... 73/114.31, 114.69, 114.71, 114.73, 73/114.74
See application file for complete search history.

(56) References Cited

U.S. PATENT DOCUMENTS

| | | | |
|---|---|---|---|
| 7,267,117 B2* | 9/2007 | Tonetti et al. | 123/704 |
| 2005/0274369 A1* | 12/2005 | Tonetti et al. | 123/704 |
| 2007/0044472 A1 | 3/2007 | Zhang | |
| 2011/0035133 A1* | 2/2011 | Vigild et al. | 701/103 |
| 2012/0037134 A1* | 2/2012 | Jankovic et al. | 123/568.21 |
| 2012/0265396 A1* | 10/2012 | Makki et al. | 701/30.8 |
| 2013/0131997 A1* | 5/2013 | Inagaki | 702/24 |
| 2013/0268176 A1* | 10/2013 | Song et al. | 701/102 |

FOREIGN PATENT DOCUMENTS

| | | |
|---|---|---|
| DE | 27 44 844 | 4/1978 |
| DE | 10 2005 056152 | 5/2007 |

\* cited by examiner

*Primary Examiner* — Eric S McCall
(74) *Attorney, Agent, or Firm* — Kenyon & Kenyon LLP

(57) ABSTRACT

A method/device for evaluating oxygen sensor signals of an air supply channel connected to an exhaust gas channel of the internal combustion engine, via an exhaust gas recirculation having at least one exhaust gas recirculation valve; the oxygen sensor being downstream from the exhaust gas recirculation initiation; the sensor signal(s) being corrected as a function of at least one characteristics variable describing the dependence of the sensor signal on the oxygen concentration or a correlated variable, and/or additional physical variables. At at least one engine operating point(s), in response to a closed exhaust gas recirculation valve, output oxygen sensor signals and additional operating point parameters are recorded/stored; and an adaptation of the characteristic variables is derived assuming that the gas composition corresponds to pure air. Also, a characteristics curve adjustment and a compensation of pressure temperature dependencies may be performed to improve the accuracy of the oxygen sensor signals.

13 Claims, 1 Drawing Sheet

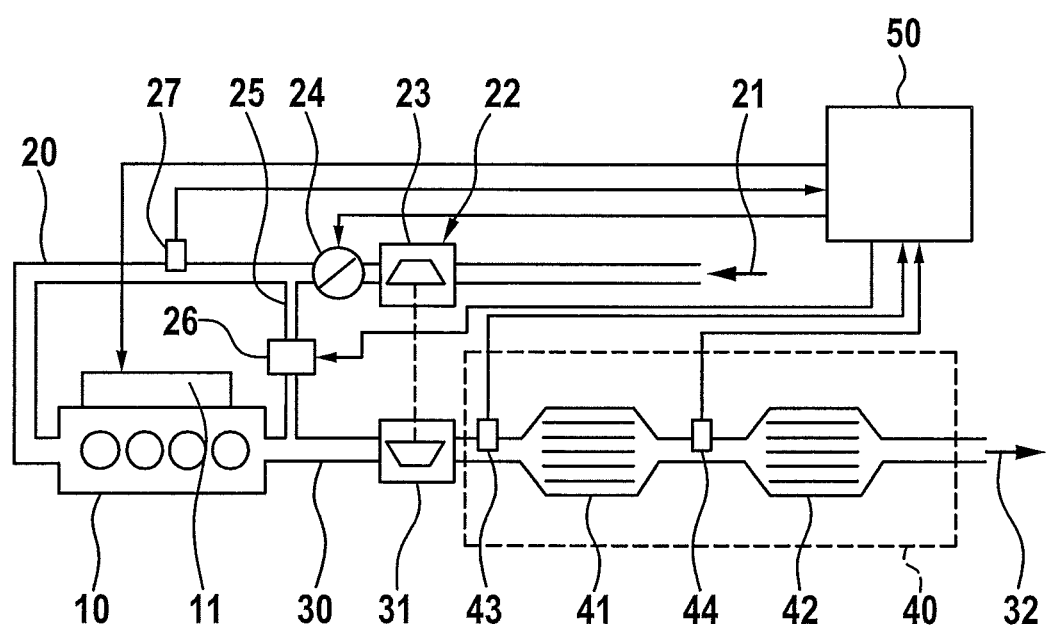

METHOD AND DEVICE FOR ADAPTING SIGNALS OF AN OXYGEN SENSOR IN THE AIR SUPPLY CHANNEL OF AN INTERNAL COMBUSTION ENGINE

RELATED APPLICATION INFORMATION

The present application claims priority to and the benefit of German patent application no. 10 2012 201 830.1, which was filed in Germany on Feb. 8, 2012, the disclosure of which is incorporated herein by reference.

FIELD OF THE INVENTION

The present invention relates to a method for evaluating signals of an oxygen sensor in the air supply channel, the air supply channel being connected to an exhaust tract of the internal combustion engine, via an exhaust gas recirculation which has at least one exhaust gas recirculation valve, and the oxygen sensor in the air supply channel is situated in the air supply channel downstream from the exhaust gas recirculation initiation, the sensor signal being corrected as a function of a characteristic variable or a plurality of characteristic variables, which describe the dependence of the sensor signal on the oxygen concentration or a variable correlated with it, and/or additional physical variables. Furthermore, the present invention relates to a device for implementing the method according to the present invention.

BACKGROUND INFORMATION

Modern internal combustion engines frequently have a system for external exhaust gas recirculation (AGR). By this, one should understand a pipe connection between the exhaust gas pipe and the intake manifold which is able to be controlled using an exhaust-gas recirculation valve (AGR valve) to be open and closed, and which may be equipped with a pump device. In this pipe connection, combusted exhaust gas flows back into the intake manifold, either driven by a gradient between the exhaust gas counterpressure and the intake manifold pressure or by the pump device. The variant without the pump device occurs far more frequently.

If the internal combustion engine is outfitted with an exhaust gas turbocharger, then, as a rule, the exhaust point of the exhaust gas is upstream of the turbine and the supply point to the intake manifold is downstream from the compressor. A supply point to the intake manifold upstream of the compressor is also conceivable, however. The admixture of exhaust gas to the aspirated air is able to improve the efficiency and/or the raw emission of the internal combustion engine.

The legal emission regulations and on-board diagnostic regulations, in the most important vehicle markets, make the use of oxygen sensors in the exhaust tract of the internal combustion engine unavoidable.

In this invention, the term oxygen sensor designates every type of gas sensor which emits a signal that correlates with the concentration of oxidizing and reducing gas components. The ratio of oxidizing to reducing gas components before combustion is defined by the lambda value. In a motor operation having a sufficiently high excess of air (lean operation), there are no reducing components present in the exhaust gas, and there is almost only oxygen present as oxidizing component. That is why measuring lambda at these operating points means the same as measuring the oxygen concentration.

Oxygen sensors for internal combustion engines, that are common in the trade, were developed for use in the exhaust tract and may usually be developed as lambda probes, whose primary measured quantity is a lambda value, or as an $NO_x$ sensor, whose primary measured quantity is the $NO_x$ concentration, but which is also able, besides that, to supply a lambda signal.

The signals of the oxygen sensors are usually supplied to an engine control unit, which regulates the operating parameters of the internal combustion engine, on the basis of this and additional measured values. Furthermore, in the engine control unit, methods are implemented for the optimal operation and the on-board diagnosis of the oxygen sensors. The following methods are a part of this:

A method for generating a further signal of the oxygen sensor that is correlated with the sensor temperature. This may be a resistance value, for example.

A method for controlling and regulating the heating of the oxygen sensor, with the aim of holding the sensor in the optimal temperature window. For this purpose, the above cited temperature signal is used.

A method for compensating the temperature dependence of the oxygen sensor, in case the sensor temperature deviates from the target temperature, i.e. from the value for which the sensor characteristics curve is specified.

A method for compensating for the pressure dependence of the oxygen sensor, in case the pressure at the location of installation of the sensor deviates from the value for which the sensor characteristics curve is specified.

A method for characteristics curve compensation. In this case, at special operating points at which the oxygen concentration is known independently of the sensor signal, the sensor signal is compared to the signal value specified for this oxygen concentration, and from the comparison a correction value is ascertained, using which the sensor signal is corrected as a result. Among the known methods, the oxygen concentration known independently of the sensor signal, is the concentration value in pure air. If the sensor is installed in the exhaust tract, however, the operating points, in which the oxygen sensor is exposed to pure air, are naturally seldom and brief. Almost all known methods are supported for this on the so-called overrun condition. One problem is that an overrun condition cannot be forced by the engine control, but is a function of the driver's torque command.

Oxygen sensors in the intake manifold of internal combustion engines are discussed, for instance, in DE 2744844 A1 and from US 2007/0044472 A1. The external exhaust gas recycling is regulated based on the signal of this sensor.

In that manner, DE 2744844 A1 discusses a method for regulating the air/fuel ratio of a mixture supplied to an internal combustion engine, it being provided that, in the intake manifold of the internal combustion engine using a sensor, one should scan a parameter which is representative for the air/fuel ratio of the mixture, and during the first state, at which the temperature of the sensor is below a specified value, above which sensor is operable, one heat the sensor, that one break off the heating of the sensor after a temperature is reached above the specified value and that one should regulate the air/fuel ratio of the mixture produced for the internal combustion engine to a desired value, by regulating the flow throughput of the fuel supplied to the internal combustion engine for the production of the mixture. An appropriate apparatus for carrying out the method is also described.

It is true that use of oxygen sensors in the intake manifold occurs substantially less than the use in the exhaust tract of the internal combustion engine. For this reason, for the operation of oxygen sensors in the intake manifold, not so many highly developed methods exist as yet as for operation in the exhaust tract.

Thus, DE 102005056152 A1, for example, discusses a method and a corresponding device for implementing the method, for calibrating a lambda measuring signal provided by a broadband lambda sensor situated in the exhaust gas region of an internal combustion engine, in which a correction value for ascertaining a measure for the actual lambda value is drawn upon, the correction value being ascertained during a specified operating state of the internal combustion engine, in which no fuel metering takes place, and the rotational speed of the internal combustion engine is above a threshold value, the correction value being ascertained as a function of the sensor temperature of the broadband lambda sensor during the specified operating state. Consequently, this method describes a method for learning the temperature dependence of lambda probes in the exhaust track.

For a series of methods for the operation in the exhaust gas pipe, as was described above, for instance, the differences in the environmental conditions in the intake manifold from those in the exhaust tract are relevant. In some cases, the environmental conditions in the intake manifold prepare particular difficulties that require new solutions. However, in some cases they also offer possibilities for methods which are not possible in the environmental conditions in the exhaust tract, although they would be desirable to function there too. In the operation of an oxygen sensor in the intake manifold or generally in the air supply channel, a particular challenge is posed especially by the temperature dependence.

Since the oxygen sensor in the air supply channel is exposed to cold air, and not to hot exhaust gases, there is an increased possibility that the performance of the sensor heating is not sufficient

SUMMARY OF THE INVENTION

It is therefore an object of the exemplary embodiments and/or exemplary methods of the present invention to provide a method by which the accuracy of an output signal of an oxygen sensor in the air supply channel is able to be increased and, in particular, temperature dependences and/or pressure dependences are able to be compensated for.

It is a further object of the exemplary embodiments and/or exemplary methods of the present invention to provide a corresponding device for implementing the method.

This object relating to the method is attained by the features described herein.

According to the exemplary embodiments and/or exemplary methods of the present invention it is provided that at one or more operating points of the internal combustion engine, in response to a closed exhaust gas recirculation valve, output signals of the oxygen sensor, as well as additional operating point parameters are recorded and stored, and from this an adaptation of the characteristic variables of the oxygen sensor is derived, on the assumption that the gas composition corresponds to that of pure air. In this connection, the method is made useful in that the oxygen sensor in the air supply channel is exposed to pure air if the exhaust gas recirculation valve is closed. In contrast to the situation in the exhaust tract, there frequently exist operating points in which the oxygen sensor is exposed to a stationary and relatively high current of pure air. These are favorable suppositions in order, on the one hand to be able to carry out a characteristics curve compensation, and on the other hand, to attain particularly a compensation of pressure and temperature dependencies, with which the accuracy of the signals of an oxygen sensor in the air supply channel is able to be increased.

In this instance, it may be provided that the further physical variables, whose effect on the sensor signal is described by the characteristic quantities, are the pressure p at the sensor and/or the sensor temperature T.

One method variant provides, with respect to an optimal adaptation of characteristic variables of the oxygen sensor, that from the output signals of the oxygen sensor as well as of the additional operating point parameters, correction quantities for a characteristics curve slope F_KL of the sensor characteristics curve as a function of the oxygen concentration as a scalar factor, coefficient for a polynomial $P\_T_{(T)}$, which describes the temperature dependence, a correcting quantity k for the pressure p, which describes the dependence of the sensor signal on the pressure p, or any combination of the previously named correction terms be calculated, by which the output signal of the oxygen sensor is able to be corrected via a correction function. In particular, one may thereby ensure the elimination of temperature influences and pressure influences. In this connection, it should be noted that the dependence on the temperature may also go into the correction as an additive term. However, a polynomial $P\_T_{(T)}$ may be used which goes in as a multiplicative term One method variant provides for this that many values for the output signals of the oxygen sensor, as well as additional operating point parameters, be recorded and the correction terms be determined using overdetermined equation systems, optimization methods for minimizing residual deviations, regression methods or a recursive least squares algorithm. The correction terms are able to be fitted using such mathematical methods, which are sufficiently described in the literature. When enough values are available, the correlation factor particularly increases in regression methods, which contributes to increased statistical certainty of the calculation, and thus improves the adaptation.

With regard to carrying out the method, it has turned out to be advantageous if, for the recording and storing of operating point parameters, the pressure p is measured at the sensor installation location or in its vicinity, and the temperature T is measured or determined by modeling. The latter may be used if directly accessible data on the pressure and/or the temperature are not available because of lacking sensors. Such models are already being implemented these days in many cases in engine control systems. These value triplets (S_raw, p, T), where S_raw is the uncorrected sensor signal, may then be analyzed using the abovementioned method.

In order to minimize measuring noise, it may be provided that the sensor signal and/or the operating parameters be filtered over time, for the record, e.g. using a low-pass filter, and/or, in each case, an average value being formed over a predetermined number of measured values as a sliding average.

If the recording of the output signals of the oxygen sensor and of the operating point parameters is only performed after the expiration of an applicable delay time after the closing of the exhaust gas recirculation valve, it may be ensured that at least one certain air mass was put through and that a partial oxygen pressure has set in that corresponds to that of pure air. Errors may thus be minimized. In addition, using this delay time, possibly present transient processes during the change of the operating conditions may be eliminated, which would otherwise also corrupt the result. The applicable delay time in this context may depend on the geometric conditions in the air supply channel.

It is of advantage if the exhaust gas recirculation valve is closed in a targeted manner for recording the output signals of the oxygen sensor and the operating point parameters at certain times and/or in response to the reaching of certain operating states of the internal combustion engine. With that, the operating points, adapted to the adaptation requirements, may be actively set, that is, not only in the overrun condition, which is a function of the torque command of the driver, but also for operating phases which are particularly favorable with respect to a reduction in error effects, when additional operating point parameters are to be recorded.

In the method variants described above, it may be provided that the sensor characteristics curve, which describes the sensor signal as a function of the measuring physical quantity, is shown as a function of the lambda value, the reciprocal of lambda or another quantity that correlates with the oxygen concentration. With that, the various sensor types, such as broadband lambda probes or $NO_x$ sensors may be used as an oxygen sensor In one method variant, it has turned out to be advantageous if the pressure dependence of the oxygen sensor is described by a correction factor $F_{(p)}$ according to $$F_{(P)} = p_0(p+k)/(p(P_0+k)) \tag{1}$$

p representing the pressure that is measured or derived from a model, $p_0$ representing the specified nominal pressure, for which the sensor characteristics curve is defined, and k is the correction number. This factor assumes the value 1, if the oxygen sensor is operated at a pressure $p=p_0$. The correction factor $F_{(p)}$ may be parameterized using correction number k.

One application of the method, as was described above in its variants, provides the calculation of the oxygen concentration, the lambda value or a quantity, from the sensor signal of the oxygen sensor, that correlates with it, in order to ensure in internal combustion engines an optimal lambda regulation and a reduction in pollutant emissions. In this context, the use is not limited only to internal combustion engines in vehicles.

The object relating to the device is attained in that the oxygen sensor is connected to an engine control, the functionality of the method, as it was described above in its variants, being implemented in the engine control, and this having appropriate memory units for storing output signals and operating point parameters, as well as calculating units for determining correcting quantities for one or more characteristic quantities of the sensor behavior. In this instance, the functionality may be implemented as software, which brings with it advantages when it comes to updates. With that, an on-board diagnosis, as stipulated by lawgivers particularly for the operation of internal combustion engines in vehicles, may be ensured.

With that, in spite of totally different environmental conditions, broadband lambda probes customary in the trade or $NO_x$ sensors, such as those that are usually installed in the exhaust tracts of internal combustion engines, are able to be installed and operated as oxygen sensors in air supply channels of the internal combustion engine.

The exemplary embodiments and/or exemplary methods of the present invention are explained in more detail below with reference to an exemplary embodiment depicted in the FIGURE.

BRIEF DESCRIPTION OF THE DRAWING

FIG. 1 shows, in a schematic representation, the technical environment, in which the method according to the present invention is able to be used.

DETAILED DESCRIPTION

FIG. 1 shows in schematic representation, i.e. greatly simplified, the technical environment, for example, in which the exemplary embodiments and/or exemplary methods of the present invention may be used. What is shown is an internal combustion engine 10, in the form of a Diesel engine, having a fuel metering system 11, an air supply channel 20, in which a fresh air flow 21 is guided, and an exhaust tract 30, in which an exhaust gas flow 32 of internal combustion engine 10 is guided.

Along air supply channel 20, in the flow direction of fresh air flow 21, a compression stage 23 of a turbocharger 22 and a throttle valve 24 are situated. Via an exhaust-gas recirculation valve 26, an exhaust-gas recirculation 25 connects air supply channel 20 to exhaust tract 30. In addition, in air supply channel 20, an oxygen sensor 27 is situated, which may be designed, for example, as a broadband lambda probe or as an $NO_x$ sensor.

In the flow direction of exhaust gas flow 32, after internal combustion engine 10, there are shown an exhaust gas turbine 31 of turbocharger 22 and, as component parts of an exhaust gas after treatment system 40, a first exhaust gas probe 43, an oxidation catalytic converter 41 in the form of a Diesel oxidation catalytic converter, a second exhaust gas probe 44 and a particulate filter 42 in the form of a Diesel particulate filter. Exhaust gas probes 43, 44 may also be produced as lambda probes.

Fresh air is supplied to internal combustion engine 10 via air supply channel 20. In this context, the fresh air is compressed by compression stage 23 of turbocharger 22, which is driven via exhaust gas turbine 31 by exhaust gas flow 32. The air quantity supplied is able to be set by throttle valve 24. In order to reduce pollutants, fresh air flow 21 has admixed to it, via exhaust gas recirculation 25, exhaust gas from exhaust tract 30 in quantities as a function of operating parameters of internal combustion engine 10. In this context, the rate of exhaust gas recirculation may be set with the aid of exhaust gas recirculation valve 26.

In exhaust gas after treatment system 40, shown in exemplary form, pollutants emitted by internal combustion engine 10 are converted or filtered out, respectively. Thus, in oxidation catalytic converter 41, hydrocarbon substances and carbon monoxide are oxidized, while particulate filter 42 retains soot particles. Other situations for exhaust gas after treatment system 40 or other types of internal combustion engines are also conceivable.

For the operation of internal combustion engine 10 and exhaust gas after treatment system 40, the control and regulating functions required are integrated into an engine control 50. The signals of oxygen sensor 27 as well as the signals of exhaust gas probes 43, 44 are supplied for this to engine control unit 50. Corresponding to these signals and while taking into account additional data, in the example shown, throttle valve 24, fuel metering system 11 and exhaust gas recirculation valve 26 are actuated.

In order to compensate for temperature or pressure dependences in the output signals of oxygen sensor 27, the method according to the present invention provides that at one or more operating points of internal combustion engine 10, in response to a closed exhaust gas recirculation valve 26, output signals of oxygen sensor 27, as well as additional operating point parameters are recorded and stored, and from this an adaptation of the characteristic variables of oxygen sensor 27 is derived, on the assumption that the gas composition corresponds to that of pure air.

In this connection, the method uses the fact that oxygen sensor 27 in air supply channel 20 is exposed to pure air if exhaust gas recirculation valve 26 is closed. In contrast to the situation in exhaust tract 30, there frequently exist operating points in which the oxygen sensor is exposed to a stationary and relatively high current of pure air. In addition, these operating points, adapted to the adaptation requirement, may be actively set. A probe, on the other hand, such as the abovementioned exhaust gas probes 43, 44, is exposed to pure air only during an overrun condition, that is, as a function of the torque command of the driver.

Depending on the embodiment, the method adapts correction variables for the following sensor properties as a function of the sensor specimen involved, for which a priori, only a range, but not an exact value is known.

characteristics curve slope
temperature dependence and
Pressure dependence.

Moreover, the method includes the application of the adapted correction variables to the sensor signal, with the aim of obtaining an exact signal of the physical variable lambda that is to be measured, or rather the oxygen concentration.

In a method variant, the adaptation method includes the following partial operations/tasks:
1. Definition of the correction variables and establishment of the functional relationship with which they are able to be applied to the sensor signal.
2. Recording of measured values at a plurality of operating points and
3. Carrying out an adaptation method to ascertain the adapted correction variables.

The correction variables are established in the first operation. In one method variant, the following correction variables are involved:

a number $F\_KL$ for a characteristics curve slope
a polynomial $P\_T_{(T)}$ for the temperature dependence and
A number $k$ for the pressure dependence.

After the following correction function, these are applied to the sensor signal:

$$\text{Socorro} = p_0(p+k)/(p(p_0+k)) * P\_T_{(T)} * F\_KL * S\_\text{raw} \quad (2)$$

where

| | |
|---|---|
| $S\_\text{raw}$ | is the uncorrected sensor signal |
| $S\_\text{corr}$ | is the corrected sensor signal |
| P | is the pressure at the installation location of the sensor |
| $P_0$ | is the pressure for which the sensor characteristics line is specified |
| T | is the sensor temperature. |

In the second operation there takes place a recording of values $S\_\text{raw}$, p and T at a plurality of operating points having a closed exhaust gas recirculation valve 26. The recording begins only after a certain waiting period after the closing of exhaust gas recirculation valve 26, to ensure that pure air flows by at the installation location of oxygen sensor 27. Furthermore, the values for noise removal may be filtered in a suitable way, for instance, by a low-pass filter or averaging over a certain time period. If no pressure sensor and/or temperature sensor is available near the installation location of oxygen sensor 27, output values of modeling methods may be used for the values of pressure p and/or for temperature T. Temperature T, however, may usually be determined from the inner resistance of oxygen sensor 27. With that, one obtains a series of value triplets ($S\_\text{raw}$, p, T).

The abovementioned correction variables $F\_KL$, $P\_T_{(T)}$ and $k$ are ascertained in the third operation, using an adaptation method. This happens based on the following consideration:

$$S\_\text{air} = p_0(p+k)/(p(p_0+k)) * P\_T_{(T)} * F\_KL * S\_\text{raw} \quad (3)$$

where the value $S\_\text{air}$ is the value of the specified sensor characteristics curve for pure air.

The measurement of the value triplet ($S\_\text{raw}$, p, T) is generally affected by diverse interference effects, such as, as a result of a variation in the environmental conditions during the measurement, inaccuracies in the pressure or temperature measurements or modeling, hydrocarbon impurities in the air, etc. It is therefore helpful, by recording of as many value triplets from the second operation, to ascertain an overdetermined equation system for $F\_KL$, $P\_T_{(T)}$ and $k$, and solve this within the meaning of a suitable regression method. Such methods may be, for instance, least-square methods or other methods described in the literature.

An adaptation method for the correction values sought will come about by carrying out such an adaptation method online, and updating it with each new recorded value triplet.

What is claimed is:

1. A method for evaluating signals of an oxygen sensor, the method comprising:
    obtaining sensor signals from the oxygen sensor in an air supply channel of an internal combustion engine, the air supply channel being connected to an exhaust gas channel of the internal combustion engine, via an exhaust gas recirculation which has at least one exhaust gas recirculation valve, the oxygen sensor being situated in the air supply channel downstream from the exhaust gas recirculation initiation;
    correcting the sensor signals as a function of at least one characteristics variable, which describes the dependence of the sensor signals on at least one of (i) one of an oxygen concentration and a variable correlated with the oxygen concentration, and (ii) at least one additional physical variable;
    at at least one operating point of the internal combustion engine, in response to a closed exhaust gas recirculation valve, outputting signals of the oxygen sensor, and recording and storing the signals and additional operating point parameters; and
    deriving an adaptation of the characteristics variables of the oxygen sensor, based on the assumption that the gas composition corresponds to that of pure air.

2. The method of claim 1, wherein the at least one additional physical variable, whose effect on the sensor signal is described by the at least one characteristics variable, include at least one of a pressure p at a location of the sensor and a sensor temperature T.

3. The method of claim 1, wherein for the recording and storing of the operating point parameters, the pressure p is measured at the sensor installation location or in its vicinity, and the temperature T is measured or determined by modeling.

4. The method of claim 1, wherein at least one of the sensor signal and the operating point parameters are filtered over time and/or in each case an average value is formed over a predetermined number of measured values.

5. The method of claim 1, wherein the recording of the output signals of the oxygen sensor and of the operating point parameters is performed only after an expiration of an applicable delay time period after a closing of the exhaust gas recirculation valve.

6. The method of claim 1, wherein the exhaust gas recirculation valve is closed in a targeted manner for recording the output signals of the oxygen sensor and of the operating point parameters at certain times and/or in response to the reaching of certain operating states of the internal combustion engine.

7. The method of claim 1, further comprising:
Determining one of an oxygen concentration, a lambda value and a variable correlating with the lambda value from the sensor signals of the oxygen sensor.

8. The method of claim 1, wherein from the output signals of the oxygen sensor from the additional operating point parameters, correction quantities for a characteristics curve slope F_KL of the sensor characteristics curve are determined as a function of the oxygen concentration, coefficients for a polynomial $P\_T_{(T)}$ are determined which describes the temperature dependence, a correction quantity k for the pressure p is determined which describes the dependence of the sensor signal on the pressure p, and any combination of the correction quantities are determined, by which the output signal of the oxygen sensor is correctable via a correction function.

9. The method of claim 8, wherein the correction quantities are determined using at least one of over determined equation systems, optimization methods for minimizing residual deviations, regression methods, and a recursive least-squares algorithm.

10. The method of claim 8, wherein the oxygen concentration dependence of the sensor characteristics curve is described as a function of a lambda value, of its reciprocal or of another variable that correlates with the oxygen concentration.

11. The method of claim 8, wherein the pressure dependence of the oxygen sensor is described by a correction factor $F_{(p)}$ according to the equation $F(p)=p_0(p+k)/(p(p_0+k))$, where p describes a measured pressure or a pressure derived from a model, $p_0$ describes a specified nominal pressure for which the sensor characteristics curve is defined, and k describes a correction number.

12. A device for evaluating signals of an oxygen sensor, comprising:
an engine control unit having a storage arrangement for storing output signals from the oxygen sensor and operating point parameters and having a processor arrangement for determining and applying correction quantities for at least one characteristics variable of the oxygen sensor, wherein the oxygen sensor is in an air supply channel of an internal combustion engine, the air supply channel being connected to an exhaust gas channel of the internal combustion engine, via an exhaust gas recirculation which has at least one exhaust gas recirculation valve, the oxygen sensor being situated in the air supply channel downstream from the exhaust gas recirculation initiation;
wherein the processor arrangement is adapted to correct the sensor signals as a function of the at least one characteristics variable, which describes the dependence of the sensor signals on at least one of (i) one of an oxygen concentration and a variable correlated with the oxygen concentration, and (ii) at least one additional physical variable,
wherein at least one operating point of the internal combustion engine, in response to a closed exhaust gas recirculation valve, signals of the oxygen sensor are output and the signals and additional operating point parameters are recorded and stored by the engine control unit, and
wherein the processor arrangement derives an adaptation of the characteristics variables of the oxygen sensor, based on the assumption that the gas composition corresponds to that of pure air.

13. The device of claim 12, wherein the oxygen sensor is configured as one of a broadband lambda probe and an $NO_x$ sensor.

* * * * *